United States Patent
Guo et al.

(10) Patent No.: US 10,907,060 B2
(45) Date of Patent: Feb. 2, 2021

(54) PRINTING ON A TEXTILE

(71) Applicant: Hewlett-Packard Development Company, L.P., Spring, TX (US)

(72) Inventors: Dennis Z. Guo, Oceanside, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/619,825

(22) PCT Filed: Oct. 18, 2017

(86) PCT No.: PCT/US2017/057208
§ 371 (c)(1),
(2) Date: Dec. 5, 2019

(87) PCT Pub. No.: WO2019/078854
PCT Pub. Date: Apr. 25, 2019

(65) Prior Publication Data
US 2020/0131388 A1  Apr. 30, 2020

(51) Int. Cl.
*C09D 11/38* (2014.01)
*C09D 11/107* (2014.01)
(Continued)

(52) U.S. Cl.
CPC .......... *C09D 11/322* (2013.01); *C09D 11/107* (2013.01); *C09D 11/38* (2013.01);
(Continued)

(58) Field of Classification Search
CPC .............. B41M 5/0047; B41M 5/0052; B41M 5/0088; B41M 5/0094; C09D 11/38;
(Continued)

(56) References Cited

U.S. PATENT DOCUMENTS 5,510,415 A    4/1996  Zahrobsky
8,227,524 B2   7/2012  Rolly
(Continued)

FOREIGN PATENT DOCUMENTS

CN    104213443    12/2014
EP    1158029      11/2001
(Continued)

OTHER PUBLICATIONS

Khan, M. R., "Pigment Ink Formulation, Tests and Test Methods for Pigmented Textile Inks", Chemistry and Materials Research, ISSN 2224-3224, vol. 8, 2016, 9pgs.
(Continued)

*Primary Examiner* — Anh T Vo
(74) *Attorney, Agent, or Firm* — Dierker & Kavanaugh PC

(57) ABSTRACT

In an example of a method for printing on a textile, a print is generated by thermal inkjet printing a thermal inkjet ink on a cotton fabric. The thermal inkjet ink consists of a pigment, a single dispersant and binder resin, a vehicle, and a balance of water. The single dispersant and binder resin is a styrene acrylic resin having an acid number greater than 100 mg KOH/g and a weight average molecular weight less than 50,000. The vehicle includes a co-solvent, an anti-kogation agent, a humectant, a surfactant, a biocide, or combinations thereof. The print is generated without a post-printing curing process.

15 Claims, 2 Drawing Sheets

(51) Int. Cl.
*C09D 11/322* (2014.01)
*D06P 1/52* (2006.01)
*D06P 5/20* (2006.01)
*D06P 5/30* (2006.01)

(52) U.S. Cl.
CPC ............ *D06P 1/525* (2013.01); *D06P 1/5221* (2013.01); *D06P 5/2077* (2013.01); *D06P 5/30* (2013.01)

(58) Field of Classification Search
CPC ... C09D 11/106; C09D 11/107; C09D 11/322; D06P 1/44; D06P 1/5221; D06P 1/525; D06P 1/5257; D06P 5/2077; D06P 5/30
See application file for complete search history.

(56) References Cited

U.S. PATENT DOCUMENTS

| | | | |
|---|---|---|---|
| 9,206,547 | B2 | 12/2015 | Saito |
| 9,222,217 | B2 | 12/2015 | Ikeda et al. |
| 9,340,695 | B2 | 5/2016 | Dura et al. |
| 9,567,706 | B2 | 2/2017 | Sugiyama |
| 2003/0084817 | A1 | 5/2003 | Sarkisian et al. |
| 2007/0129463 | A1 | 6/2007 | Ma et al. |
| 2008/0044633 | A1 | 2/2008 | Ming et al. |
| 2009/0095200 | A1 | 4/2009 | Belmont |
| 2010/0273929 | A1 | 10/2010 | Kitagawa et al. |
| 2012/0052261 | A1* | 3/2012 | Aoyama .............. B41M 5/0011 428/195.1 |
| 2013/0176369 | A1* | 7/2013 | Gotou .................... C09D 11/40 347/100 |
| 2014/0068877 | A1 | 3/2014 | Ellis |
| 2014/0076182 | A1 | 3/2014 | Tuerk et al. |
| 2015/0218397 | A1 | 8/2015 | Li et al. |
| 2015/0252302 | A1* | 9/2015 | Rieth ....................... A61Q 5/10 514/772 |
| 2017/0051170 | A1* | 2/2017 | Nakagawa .............. C09D 11/38 |
| 2017/0058453 | A1 | 3/2017 | Pan et al. |
| 2017/0145239 | A1 | 5/2017 | Mozel et al. |
| 2017/0190929 | A1 | 7/2017 | Li |

FOREIGN PATENT DOCUMENTS

| | | |
|---|---|---|
| EP | 2033229 | 7/2012 |
| EP | 2857462 | 4/2015 |
| EP | 3101069 | 12/2016 |
| JP | 2009235652 | 10/2009 |
| JP | 2016102283 | 6/2016 |
| WO | WO-2000015898 | 3/2000 |
| WO | WO-2000056972 | 9/2000 |
| WO | WO-0132974 | 5/2001 |
| WO | WO-0136547 | 5/2001 |
| WO | WO-2006061995 | 6/2006 |
| WO | WO-2007094881 | 8/2007 |
| WO | WO-2009034394 | 3/2009 |
| WO | WO-2012105949 A1 | 8/2012 |
| WO | WO-2013132439 | 9/2013 |
| WO | WO-2014039306 | 3/2014 |
| WO | WO-2015036812 | 3/2015 |
| WO | WO-2015130498 | 9/2015 |
| WO | WO-2017068315 | 4/2017 |
| WO | WO-2017081694 | 5/2017 |
| WO | WO-2017110744 | 6/2017 |
| WO | WO-2017146071 | 8/2017 |

OTHER PUBLICATIONS

Malik, S. K., et al., "Advances in ink-jet printing technology of textiles", Indian Jrnl. of Fibre & Textile Research, vol. 30, Mar. 2005, pp. 99-113.

Chang, et al "Effects of polymeric dispersants and surfactants on the dispersing stability and high-speed-jetLing properties of aqueous-pigment-based ink jet inks", Jrnl. of Polymer Sci. Part E: Polymer Physics, vol. 41, Issue 16, 2003, Abstract.

Marie, M M et al "Pigment Ink Formulation for Inkjet Printing of Different Textile Materials", Intl. Jrnl. of Innovation & App. Studies, ISSN 2028-9324 vol. 4, 2013 pp. 239-247.

* cited by examiner

PRINTING ON A TEXTILE

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1:
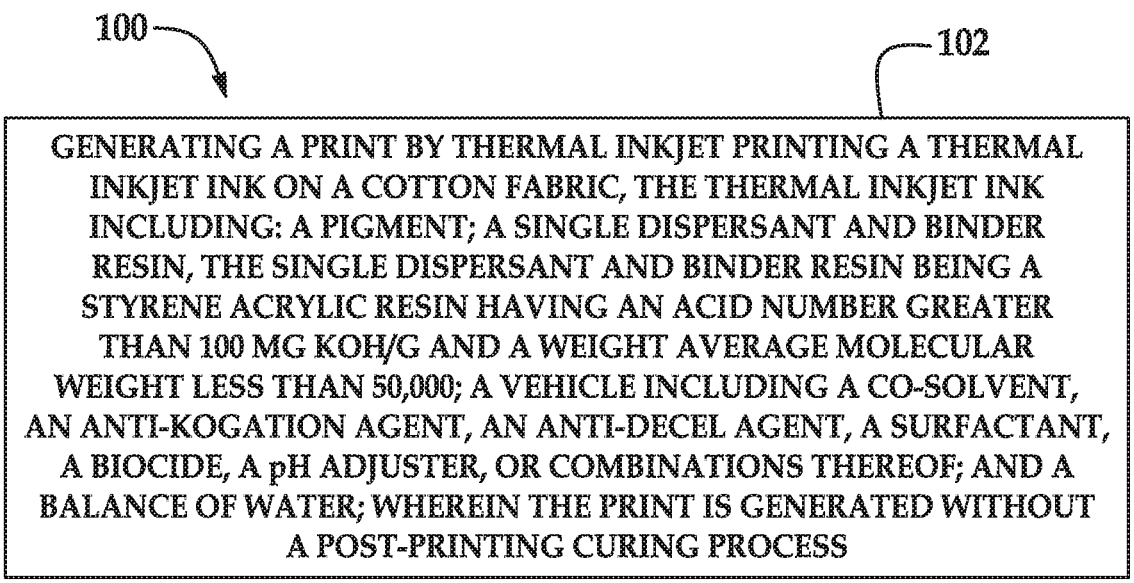
FIG. 1 illustrates an example of a method for printing on a textile.

The textile market is a major industry, and printing on textiles, such as cotton, polyester, etc., has been evolving to include digital printing methods. However, the vast majority of textile printing (≥95%) is still performed by analog methods, such as screen printing. Multi-color printing with analog screen printing involves the use of a separate screen for each color that is to be included in the print, and each color is applied separately (with its corresponding screen). In contrast, digital inkjet printing can generate many colors by mixing basic colors in desired locations on the textile, and thus avoids the limitations of analog screen printing.

Digital inkjet printers for textile printing are often based on piezoelectric technology and/or involve the use of reactive inks and/or acid dyes. With fabrics, the use of reactive inks and/or acid dyes generally involves pre- and post-treatment in order for the colorant to fix into the fabric. For example, a post-print steaming process may be used to fix reactive dyes and/or acid dyes. Moreover, extensive washing may be used after printing with reactive inks in order to remove unreacted chemicals used in the inks. To avoid this extensive washing, it may be desirable to use pigmented inks to digitally print on cotton textiles. However, generating prints with some pigmented inks involves a post-treatment process, such as applying heat and/or pressure, in order to cure the print and to achieve a desired washfastness.

In some examples of a method disclosed herein, a thermal inkjet ink is used to generate print on a cotton fabric. In some examples of another method disclosed herein, the thermal inkjet ink is made. In any of the examples, the thermal inkjet ink may consist of a pigment, a single dispersant and binder resin, a vehicle, and a balance of water. The single dispersant and binder resin may be a styrene acrylic resin having an acid number greater than 100 mg KOH/g and a weight average molecular weight less than 50,000. It has been unexpectedly discovered that that the styrene acrylic resins disclosed herein provide better washfastness than polyurethane binders when printed on the cotton fabric. Typically, polyurethane binders provide better durability than the styrene acrylic resins when printed on paper-based media. Many paper-based media include cellulose fibers, and thus are similar to cotton fibers, which are almost pure cellulose. Thus, it was unexpected that the styrene acrylic resins would outperform the polyurethane in terms of durability as illustrated in the Example section disclosed herein.

The thermal inkjet ink disclosed herein also enables prints, having a desirable washfastness, to be generated on the cotton fabric (e.g., an as-received pre-treated cotton fabric) without being exposed to a post-treatment process (e.g., a post-printing curing process). "Washfastness," as used herein, refers to the ability of a print on a fabric to retain its color after being exposed to washing. Washfastness can be measured in terms of optical density (OD) stability and ΔE.

The term "optical density stability," as referred to herein, means that the degree to which the printed image retards transmitted rays of light remains substantially unchanged after the printed image is washed. To determine the optical density stability of a print, the change in optical density may be measured before and after washing the print, and the percentage of optical density change may be determined. The optical density may be considered to be "substantially unchanged after being washed" when the percentage of optical density change is 10% or less.

The term "ΔE," as used herein, refers to the change in the L*a*b* values of a color (e.g., cyan, magenta, yellow, black, red, green, blue, white) after washing. ΔE can be calculated by the following equation:

$$\Delta E = \sqrt{\begin{bmatrix}(L*\text{before}-L*\text{after})^2 + (a*\text{before}-a*\text{after})^2 + \\ (b*\text{before}-b*\text{after})^2\end{bmatrix}}$$

where L* is lightness, a* is the color channel for color opponents green-red, and b* is the color channel for color opponents blue-yellow. When the value of ΔE is less than or equal to 4, this may denote good washfastness. In an example disclosed herein, the ΔE of a print ranges from about 2.0 to about 3.5 after the print has been washed.

The thermal inkjet ink utilized or made in the methods disclosed herein may also have excellent jettability. Jettability performance can be measured in terms of a Turn On Energy (TOE) curve, decap performance, and decel.

The term "Turn On Energy (TOE) curve," as used herein, refers to the drop weight of an inkjet ink as a function of firing energy. For an inkjet ink with a good TOE curve, its drop weight can rapidly increase (with increased firing energy) to reach the designed drop weight for the pen architecture used; and this ink may maintain a steady drop weight when the firing energy exceeds TOE. In other words, a sharp TOE curve can lead to good jettability performance. In contrast, an inkjet ink with a poor TOE curve may show a slow increase in drop weight (with increased firing energy) and/or may never reach the designed drop weight for the pen architecture. A poor TOE curve can lead to poor jettability performance.

The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. A decreased decap time can lead to poor jettability performance.

The term "decel," as used herein, refers to the decrease in drop velocity over time (e.g., 6 seconds) with continuous firing of the nozzles. A large decrease in drop velocity (e.g., a decrease in drop velocity of greater than 1 m/s) can lead to poor jettability performance. In contrast, no decel (i.e., no decrease in drop velocity) or acceptable decel (e.g., a decrease in drop velocity of 1 m/s or less) can lead to good jettability performance.

The thermal inkjet ink utilized or made in the methods disclosed herein may also have good stability. Stability performance can be measured in terms of physical stability. The term "physical stability," as referred to herein, means the ability of the pigment particles in the thermal inkjet ink to remain substantially unchanged over time. To determine the physical stability of an ink, the change in particle size may be measured over time, and the percentage of size change may be determined. The particle size may be considered to be "substantially unchanged over time" when the percentage of size increase is 10% or less.

To facilitate the measurement of the particle size percentage change, the ink formulations may be stored in an accelerated storage (AS) environment. The particle size may be measured before and after the ink formulations have been stored in the AS environment. The accelerated storage environment may be an environment that has a temperature ranging from about 45° C. to about 60° C. In an example, the accelerated storage environment is an oven baked at a temperature of about 60° C. and the ink formulations are stored in the AS environment for about one week.

An additional way to facilitate the measurement of the particle size percentage change is to subject the ink formulations to a freeze-thaw or Temperature-cycle (T-cycle) condition. A T-cycle test may indicate an instability in the ink formulations that is not indicated by an AS environment test. Conversely, an AS environment test may indicate an instability in the ink formulations that is not indicated by a T-cycle test. A stable ink formulation should be able pass both an AS environment test and a T-cycle test. When conducting a T-cycle test, the particle size may be measured before and after the ink formulations have undergone the T-cycle. The T-cycle may involve heating the ink formulation to a high temperature and maintaining the ink formulation at the high temperature for a few hours, and then cooling the ink formulation to a low temperature and maintaining the ink formulation at the low temperature for a few hours. The process may be repeated for a number of cycles (e.g., 5).

A large particle size increase can lead to a short shelf life of the ink formulation. As one example, a large particle size increase may result from phase separation in the bulk ink (e.g., pigments separating from the vehicle, agglomerating with one another, and/or settling), which would cause the ink to be unusable. Further, a large particle size increase may accelerate pigment settlement due to gravity and the increased mass of the particles (as compared to the mass of the particle before the size increase). A large particle size increase may also alter the jettability performance and/or the image quality performance. Pigment agglomeration and/or settling may render the ink more difficult to jet.

Referring now to FIG. 1, an example of a method 100 for printing on a textile is depicted. One example of the method 100 for printing on a textile comprises: generating a print by thermal inkjet printing a thermal inkjet ink on a cotton fabric, the thermal inkjet ink including: a pigment; a single dispersant and binder resin, the single dispersant and binder resin being a styrene acrylic resin having an acid number greater than 100 mg KOH/g and a weight average molecular weight less than 50,000; a vehicle including a co-solvent, an anti-kogation agent, an anti-decel agent, a surfactant, a biocide, a pH adjuster, or combinations thereof; and a balance of water; wherein the print is generated without a post-printing curing process.

As shown at reference numeral 102, the method 100 includes generating the print by thermal inkjet printing the thermal inkjet ink on the cotton fabric. As mentioned above, the thermal inkjet ink includes the pigment, the single dispersant and binder resin, the vehicle, and a balance of water. In some examples, the thermal inkjet ink consists of the pigment, the single dispersant and binder resin, the vehicle, and a balance of water.

In an example, the pigment is present in the thermal inkjet ink in an amount ranging from about 0.5 wt % to about 6 wt % of the total weight of the thermal inkjet ink. In another example, the pigment is present in the thermal inkjet ink in an amount ranging from about 1 wt % to about 6 wt % of the total weight of the thermal inkjet ink.

As used herein, "pigment" may generally include organic and/or inorganic pigment colorants that introduce color to the thermal inkjet ink. The pigment may be any color, including, as examples, a cyan pigment, a magenta pigment, a yellow pigment, a black pigment, a violet pigment, a green pigment, a brown pigment, an orange pigment, a purple pigment, a white pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I.

Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, BLACK PEARLS® series, the MOGUL® series, or the MONARCH® series manufactured by Cabot Corporation, Boston, Mass., (such as, e.g., REGAL® 400R, REGAL® 330R, REGAL® 660R, BLACK PEARLS® 700, BLACK PEARLS® 800, BLACK PEARLS® 880, BLACK PEARLS® 1100, BLACK PEARLS® 4350, BLACK PEARLS® 4750, MOGUL® E, MOGUL® L, and ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

The average particle size of the pigments may range anywhere from about 20 nm to about 200 nm. In an example, the average particle size ranges from about 80 nm to about 150 nm.

The pigment is dispersed with the single dispersant and binder resin. By "single dispersant and binder resin," it is meant that another dispersant and/or binder is not present in the ink formulation with the styrene acrylic resin(s) defined herein. Rather the styrene acrylic resin(s) alone provide the dispersing function and the binding function.

As a dispersant, the styrene acrylic resin(s) disclosed herein is not chemically attached (e.g., crosslinked) to the pigment. Rather, in some examples, the single dispersant and binder is physically absorbed to at least some of the pigment.

As a binder, the single dispersant and binder resin helps to bind the pigment particles together after printing. It has been found that the single dispersant and binder resin provides washfastness to prints created on cotton fabric from the thermal inkjet ink.

In an example, the single dispersant and binder resin is present in the thermal inkjet ink in an amount ranging from about 0.1 wt % to about 6 wt % of the total weight of the thermal inkjet ink. In another example, the single dispersant and binder resin is present in the thermal inkjet ink in an amount ranging from about 1 wt % to about 6 wt % of the total weight of the thermal inkjet ink.

The single dispersant and binder resin is a styrene acrylic resin having an acid number greater than 100 mg KOH/g and a weight average molecular weight less than 50,000. As used herein, the term "acid number" refers to the mass of potassium hydroxide (KOH) in milligrams that is used to neutralize one gram of the styrene acrylic resin. It is to be understood that multiple styrene acrylic resins (having an acid number greater than 100 mg KOH/g and a weight average molecular weight less than 50,000) may make up the single dispersant and binder resin. In an example of the method 100, the styrene acrylic resin has an acid number ranging from about 120 mg KOH/g to about 300 mg KOH/g. In another example of the method 100, the styrene acrylic resin has a weight average molecular weight ranging from about 3,000 to about 30,000. In still another example of the method 100, the styrene acrylic resin has an acid number ranging from about 120 mg KOH/g to about 300 mg KOH/g and a weight average molecular weight ranging from about 3,000 to about 30,000.

Examples of the single dispersant and binder resin include styrene acrylic resins available from BASF Corp., such as JONCRYL® 683 (acid number of about 165 mg KOH/g and weight average molecular weight of about 8,000), JONCRYL® 671 (acid number of about 214 mg KOH/g and weight average molecular weight of about 16,500), JONCRYL® 678 (acid number of about 215 mg KOH/g and weight average molecular weight of about 8,600), and JONCRYL® 296 (acid number of about 141 mg KOH/g and weight average molecular weight of about 11,500).

In an example of the method 100, the pigment is present in an amount ranging from about 0.5 wt % to about 6 wt % of a total weight of the thermal inkjet ink; and the single dispersant and binder resin is present in an amount ranging from about 0.1 wt % to about 6 wt % of the total weight of the thermal inkjet ink. In another example, a weight ratio of the pigment to the single dispersant and binder resin is about 1:1.

In an example, the pigment, the single dispersant and binder resin, and water make up a pigment dispersion. In an example, the pigment dispersion includes or consists of the pigment, the single dispersant and binder resin, and water. In another example, the pigment dispersion may also include, for example, a water-mixable co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. In still another example, the pigment dispersion consists of the pigment, the single dispersant and binder resin, a co-solvent, and water. The pigment dispersion may be prepared or purchased.

The other components of the thermal inkjet ink (i.e., vehicle components) may be slowly mixed with the pigment dispersion to form the thermal inkjet ink.

As used herein, the term "vehicle" may refer to the liquid fluid with which the pigment or pigment dispersion is mixed to form the thermal inkjet ink(s). A wide variety of vehicles may be used with the thermal inkjet ink(s) of the present disclosure. The vehicle may include a co-solvent, an anti-kogation agent, an anti-decel agent, a surfactant, a biocide, a pH adjuster, or combinations thereof. In an example, the vehicle consists of the co-solvent, the anti-kogation agent, the anti-decel agent, the surfactant, the biocide, a pH adjuster, or a combination thereof. In another example, the vehicle consists of water and the co-solvent, the anti-kogation agent, the anti-decel agent, the surfactant, the biocide, a pH adjuster, or a combination thereof. In still another example, the vehicle consists of the anti-kogation agent, the anti-decel agent, the surfactant, the biocide, a pH adjuster, and water.

The vehicle may include co-solvent(s). The co-solvent(s) may be present in an amount ranging from about 2 wt % to about 20 wt % (based on the total weight of the thermal inkjet ink). In an example, the vehicle includes glycerol. Other examples of co-solvents include alcohols, aliphatic alcohols, aromatic alcohols, diols, caprolactams, formamides, acetamides, and long chain alcohols. Examples of such compounds include primary aliphatic alcohols, secondary aliphatic alcohols, 1,2-alcohols, 1,3-alcohols, 1,5-alcohols, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol.

The co-solvent may also be a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol. Examples of polyhydric alcohol derivatives may include an ethylene oxide adduct of diglycerin.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, and triethanolamine.

An anti-kogation agent may also be included in the vehicle. Kogation refers to the deposit of dried ink on a heating element of a thermal inkjet printhead. Anti-kogation agent(s) is/are included to assist in preventing the buildup of kogation. In some examples, the anti-kogation agent may improve the jettability of the thermal inkjet ink. The anti-kogation agent may be present in the thermal inkjet ink in an amount ranging from about 0.1 wt % to about 1.5 wt %, based on the total weight of the thermal inkjet ink. In an example, the anti-kogation agent is present in the thermal inkjet ink in an amount of about 0.5 wt %, based on the total weight of the thermal inkjet ink.

Examples of suitable anti-kogation agents include oleth-3-phosphate (commercially available as CRODAFOS™ O3A or CRODAFOS™ N-3A) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

The vehicle may include anti-decel agent(s). As mentioned above, the decel refers to a decrease in drop velocity over time with continuous firing. Anti-decel agent(s) is/are included to assist in preventing decel. In some examples, the anti-decel agent may improve the jettability of the thermal inkjet ink. The anti-decel agent may be present in an amount ranging from about 0.2 wt % to about 5 wt % (based on the total weight of the thermal inkjet ink). In an example, the anti-decel agent is present in the thermal inkjet ink in an amount of about 1 wt %, based on the total weight of the thermal inkjet ink.

An example of a suitable anti-decel agent is LIPONIC® EG-1 (LEG-1, glycereth-26, available from Lipo Chemicals).

The vehicle of the thermal inkjet ink may also include surfactant(s). In any of the examples disclosed herein, the surfactant may be present in an amount ranging from about 0.1 wt % to about 3 wt % (based on the total weight of the thermal inkjet ink). In an example, the surfactant is present in the thermal inkjet ink in an amount of about 0.3 wt %, based on the total weight of the thermal inkjet ink.

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In some examples, the vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The vehicle may also include biocide(s). In an example, the total amount of biocide(s) in the thermal inkjet ink ranges from about 0.1 wt % to about 0.25 wt % (based on the total weight of the thermal inkjet ink). In another example, the total amount of biocide(s) in the thermal inkjet ink is about 0.22 wt % (based on the total weight of the thermal inkjet ink). In some instances, the biocide may be present in the pigment dispersion that is mixed with the vehicle.

Examples of suitable biocides include the NUOSEPT® (Ashland Inc.), UCARCIDE™ or KORDEK™ (Dow Chemical Co.), PROXEL® (Arch Chemicals) series, ACTICIDE® B20 and ACTICIDE® M20 (Thor Chemicals), and combinations thereof.

The vehicle may also include a pH adjuster. A pH adjuster may be included in the thermal inkjet ink to achieve a desired pH (e.g., a pH of about 8.5) and/or to counteract any slight pH drop that may occur over time. In an example, the total amount of pH adjuster(s) in the thermal inkjet ink ranges from greater than 0 wt % to about 0.1 wt % (based on the total weight of the thermal inkjet ink). In another example, the total amount of pH adjuster(s) in the inkjet ink composition is about 0.03 wt % (based on the total weight of the thermal inkjet ink).

Examples of suitable pH adjusters include metal hydroxide bases, such as potassium hydroxide (KOH), sodium hydroxide (NaOH), etc. In an example, the metal hydroxide base may be added to the thermal inkjet ink in an aqueous solution. In another example, the metal hydroxide base may be added to the thermal inkjet ink in an aqueous solution including 5 wt % of the metal hydroxide base (e.g., a 5 wt % potassium hydroxide aqueous solution).

The balance of the thermal inkjet ink is water. In an example, deionized water may be used. The water included in the thermal inkjet ink may be: i) part of the pigment dispersion, ii) part of the vehicle, iii) added to a mixture of the pigment dispersion and the vehicle, or iv) a combination thereof.

In some examples of the method 100, the print may be generated by thermal inkjet printing multiple thermal inkjet inks on the cotton fabric. When multiple thermal inkjet inks are used, each of the multiple thermal inkjet inks may be an example of the thermal inkjet ink described herein. In an example, multiple thermal inkjet inks may be used in the method 100 to create a multicolored print. In these examples, the multiple thermal inkjet inks may each include a different pigment, which may introduce a different color to each thermal inkjet ink. The portions of print on which the thermal inkjet ink(s) are thermal inkjet printed display the color(s) of the corresponding thermal inkjet ink(s), or a color generated by mixing of two or more of the thermal inkjet inks.

As mentioned herein, the thermal inkjet ink is thermal inkjet printed on the cotton fabric.

In an example, the cotton fabric may be an as-received pre-treated cotton fabric. As used herein, the phrase "as-received pre-treated cotton" refers to a cotton fabric that was treated prior to being purchased, and once purchased, is not exposed to any additional pre-treatment process. As such, in an example of the method 100, the cotton fabric is an as-received pre-treated cotton fabric; and generating the print is performed without performing a/another pre-treatment process on the as-received pre-treated cotton fabric. As an example, the as-received pre-treated cotton fabric may be a pre-treated cotton material that is available from Jacquard Products, Healdsburg, Calif. In an example, the cotton fabric is an as-received pre-treated cotton fabric; and a pre-treatment on the as-received pre-treated cotton fabric includes calcium, polymer, or a combination thereof. An example of the polymer used for pre-treatment may include polyacrylate and cationic polymers.

In an example, the thermal inkjet printing of the thermal inkjet ink is accomplished using a thermal inkjet printer. In the thermal inkjet printer, a media handling system feeds the cotton fabric through a print/image zone. In some examples, a series of advance or drive rollers (not shown) powered by a motor and gear assembly may be used to move the cotton fabric from a supply tray into the print/image zone for printing. The printer may have a scan axis, and a carriage may be supported for reciprocal movement along the scan axis back and forth across the print/image zone. The carriage may support inkjet applicator(s) (i.e., cartridges, pens, etc.) that dispense the thermal inkjet ink(s) disclosed herein onto the cotton fabric. The carriage is driven by a propulsion system that operates in response to control signals received from a processor.

As also mentioned above, the print is generated without a post-printing curing process. For example, the print is generated without heating after printing, without applying pressure after printing, and without applying radiation (e.g., UV radiation) after printing.

The print that is generated may exhibit a desired washfastness. In an example, the print exhibits a ΔE less than or equal to 4 after being washed. In another example, the print exhibits a ΔE ranging from about 2.0 to about 3.5 after being washed. In still another example, the print exhibits a change in optical density less than or equal to 10%. In yet another example, the print exhibits a change in optical density less than or equal to 7%. In yet another example, the print exhibits a change in optical density less than or equal to 5%. In some examples, the phrase "being washed" may mean that the print on the fabric has been exposed to a complete wash cycle multiple times (e.g., at least five times). The print on the fabric may also be rinsed, rung out, and/or allowed to air dry between wash cycles. The wash cycle may include the use of a detergent (surfactant(s)) and/or soap and/or heated water (e.g., to temperature of about 40° C.).

Figure 2:
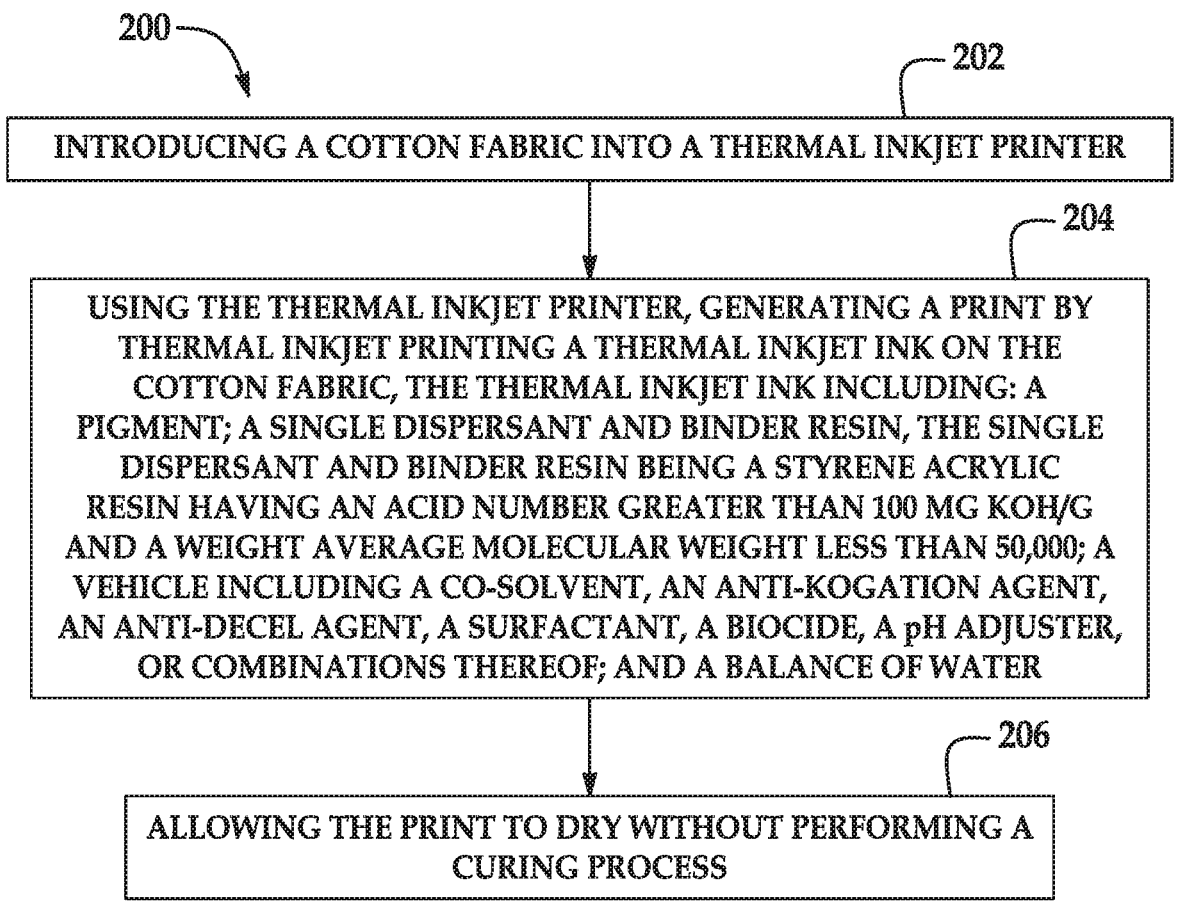
FIG. 2 is a flow diagram illustrating an example of a method for improving washfastness of a cotton fabric.

Referring now to FIG. 2, an example of a method 200 for improving washfastness of the cotton fabric is depicted. One example of the method 200 for improving washfastness of the cotton fabric comprises: introducing the cotton fabric into a thermal inkjet printer (reference numeral 202); using the thermal inkjet printer, generating a print by thermal inkjet printing a thermal inkjet ink on the cotton fabric, the thermal inkjet ink including: a pigment; a single dispersant and binder resin, the single dispersant and binder resin being a styrene acrylic resin having an acid number greater than 100 mg KOH/g and a weight average molecular weight less than 50,000; a vehicle including a co-solvent, an anti-kogation agent, an anti-decel agent, a surfactant, a biocide, a pH adjuster, or combinations thereof; and a balance of water (reference numeral 204); and allowing the print to dry without performing a curing process (reference numeral 206).

As shown at reference numeral 202, the method 200 includes introducing the cotton fabric into a thermal inkjet printer. The cotton fabric may be as described above in reference to the method 100. In a specific example of the method 200, the cotton fabric is an as-received pre-treated cotton fabric; and a pre-treatment on the as-received pre-treated cotton fabric includes calcium, a polymer, or a combination thereof.

As shown at reference numeral 204, the method 200 further includes, using the thermal inkjet printer, generating a print by thermal inkjet printing a thermal inkjet ink on the cotton fabric. The thermal inkjet ink and each of its components may be as described above in reference to the method 100. In a specific example of the method 200, the single dispersant and binder is physically absorbed to at least some of the pigment. In another specific example of the method 200, the styrene acrylic resin has an acid number ranging from about 120 mg KOH/g to about 300 mg KOH/g and a weight average molecular weight ranging from about 3,000 to about 30,000.

The generating of the print by thermal inkjet printing may be accomplished using the thermal inkjet printer, as described above in reference to the method 100. In a specific example of the method 200, the cotton fabric is an as-received pre-treated cotton fabric; and generating the print is performed without performing a pre-treatment process on the as-received pre-treated cotton fabric.

As shown at reference numeral 206, the method 200 further includes allowing the print to dry without performing a curing process. For example, the print is allowed to dry without heating, without applying pressure, and without applying radiation (e.g., UV radiation).

In an example, the method 200 further comprises washing the cotton fabric with the print thereon at least five times, wherein the print exhibits a ΔE ranging from about 2.0 to about 3.5 after the washings. Washing the cotton fabric with the print thereon may include the use of a detergent or soap. Washing the cotton fabric with the print thereon may include the use of heated water (e.g., to temperature of about 40° C.). In some examples, the method 200 may include rinsing and/or ringing out the cotton fabric with the print thereon between washes. In other examples, the method 200 may include allowing the cotton fabric with the print thereon to air dry between washes.

The print that is generated by the method 200 may be as described above in reference to the method 100.

Figure 3:
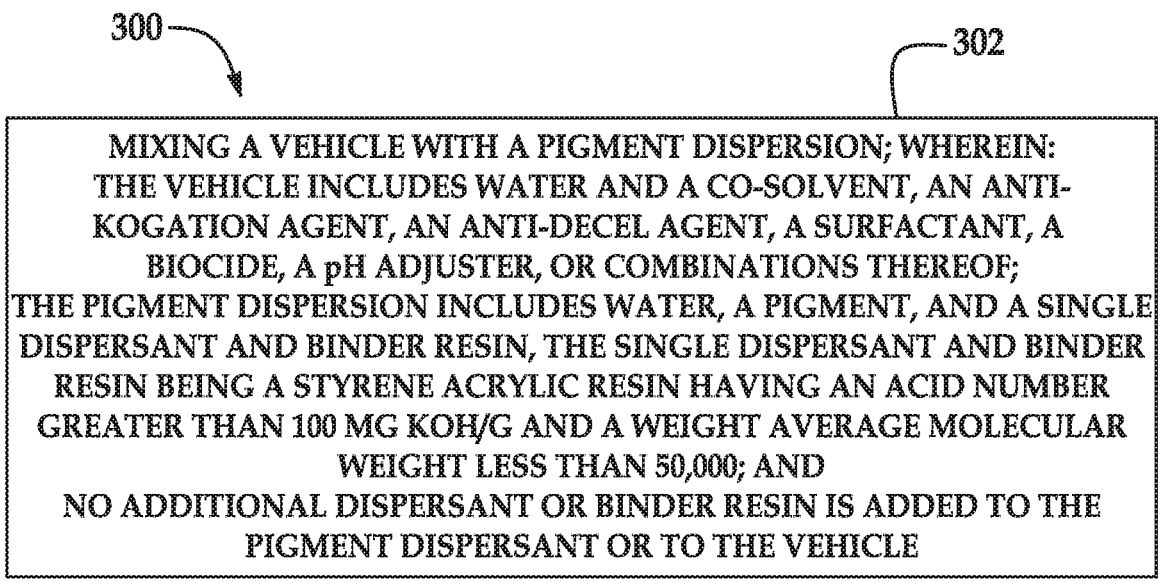
FIG. 3 illustrates an example of a method for making a thermal inkjet ink.

Referring now to FIG. 3, an example of a method 300 for making the thermal inkjet ink is depicted. One example of the method 300 for making the thermal inkjet ink comprises: mixing a vehicle with a pigment dispersion; wherein: the vehicle includes water and a co-solvent, an anti-kogation agent, an anti-decel agent, a surfactant, a biocide, a pH adjuster, or combinations thereof; the pigment dispersion includes water, a pigment, and a single dispersant and binder resin, the single dispersant and binder resin being a styrene acrylic resin having an acid number greater than 100 mg KOH/g and a weight average molecular weight less than 50,000; and no additional dispersant or binder resin is added to the pigment dispersion or to the vehicle.

As shown at reference numeral 302, the method 300 includes mixing the vehicle with the pigment dispersion. The vehicle, the pigment dispersion, and each of their components may each be as described above in reference to the method 100. Mixing the vehicle with the pigment dispersion may include adding the vehicle to the pigment dispersion, adding the pigment dispersion to the vehicle, or simultaneously adding both the vehicle and the pigment dispersion to another container.

As mentioned above, no additional dispersant or binder resin is added to the pigment dispersion or to the vehicle. The dispersant or binder resin in the thermal inkjet ink is the single dispersant and binder resin included in the pigment dispersion. In an example of the method 300, the single dispersant and binder is physically absorbed to at least some of the pigment. In another example of the method 300, the styrene acrylic resin has an acid number ranging from about 120 mg KOH/g to about 300 mg KOH/g and a weight average molecular weight ranging from about 3,000 to about 30,000.

To further illustrate the present disclosure, examples are given herein. It is to be understood these examples are provided for illustrative purposes and are not to be construed as limiting the scope of the present disclosure.

EXAMPLES

Example 1

Ten examples of the thermal inkjet ink disclosed herein were prepared, and thirteen comparative examples of thermal inkjet ink were prepared.

Each example thermal inkjet ink and each comparative thermal inkjet ink included either a black pigment dispersion or a magenta pigment dispersion. The black pigment dispersion included a black pigment, a styrene acrylic dispersant with an acid number of about 155 mg KOH/g and a weight average molecular weight of about 8,000, and a balance of water. The magenta pigment dispersion included a magenta pigment, a styrene acrylic dispersant with an acid number of about 172 mg KOH/g and a weight average molecular weight of about 10,000, and a balance of water.

The example thermal inkjet inks either included no additional binder or included JONCRYL® 683 (acid number of about 165 mg KOH/g and weight average molecular weight of about 8,000), JONCRYL® 671 (acid number of about 214 mg KOH/g and weight average molecular weight of about 16,500), JONCRYL® 678 (acid number of about 215 mg KOH/g and weight average molecular weight of about 8,600), or JONCRYL® 296 (acid number of about 141 mg KOH/g and weight average molecular weight of about 11,500) as additional binder. The comparative thermal inkjet inks included PUD1 (a polyurethane with an acid number of about 55 mg KOH/g and a weight average molecular weight of about 40,000), PUG-7581 (a polyurethane-acrylic hybrid resin with an acid number of about 40 mg KOH/g and a weight average molecular weight of about 18,000), PUG-542 (a polyurethane-acrylic hybrid resin with an acid number of about 49 mg KOH/g and a weight average molecular weight of about 22,000), or Hydran WLS-213 (a polycarbonate-polyurethane textile binder available from DIC with a weight average molecular weight greater than 100,000) as additional binder.

Each example thermal inkjet ink and each comparative thermal inkjet ink had the same general formulation except for the type of pigment dispersion, the type of additional binder, and amount of additional binder incorporated therein. The type of the pigment dispersion, the type of additional binder, and amount of additional binder in each example thermal inkjet ink and each comparative thermal inkjet ink is shown below in Table 2. The general formulation of the example thermal inkjet inks and the comparative thermal inkjet inks, except for the type of pigment dispersion, the type of additional binder, and amount of additional binder incorporated therein, is shown in Table 1, with the wt % of each component that was used. The weight percentage of the pigment dispersion represents the total pigment solids present in the final thermal inkjet ink formulations. In other words, the amount of the pigment dispersion that is added to the example or comparative thermal inkjet inks is enough to achieve a pigment solids level that is the wt %. Additionally, a 5 wt % potassium hydroxide aqueous solution was added to each of the example thermal inkjet inks and each of the comparative thermal inkjet inks until a pH of about 8.5 was achieved.

TABLE 1

| Ingredient | Specific Component | Amount (wt %) |
| --- | --- | --- |
| Pigment dispersion | Black pigment dispersion or Magenta pigment dispersion | 2 |
| Co-solvent | Glycerol | 8 |
| Anti-decel agent | LEG-1 | 1 |
| Anti-kogation agent | CRODAFOS ™ N-3A | 0.5 |
| Surfactant | SURFYNOL ® 440 | 0.3 |
| Biocide | ACTICIDE ® B20 | 0.22 |
| Water |  | Balance |

The type of the pigment dispersion, the type of additional binder, and amount of additional binder in each example thermal inkjet ink and each comparative thermal inkjet ink is shown in Table 2. The weight percentage of the binder dispersion represents the total binder solids present in the final thermal inkjet ink formulations.

TABLE 2

| Ink | Pigment dispersion | Additional binder dispersion | Amount of additional binder dispersion (wt %) |
| --- | --- | --- | --- |
| Example thermal inkjet ink 1 | Magenta pigment dispersion | No additional binder | 0 |
| Example thermal inkjet ink 2 | Magenta pigment dispersion | JONCRYL ® 683 | 1 |
| Example thermal inkjet ink 3 | Magenta pigment dispersion | JONCRYL ® 683 | 2 |
| Example thermal inkjet ink 4 | Magenta pigment dispersion | JONCRYL ® 683 | 4 |
| Example thermal inkjet ink 5 | Magenta pigment dispersion | JONCRYL ® 671 | 2 |
| Example thermal inkjet ink 6 | Magenta pigment dispersion | JONCRYL ® 678 | 2 |
| Example thermal inkjet ink 7 | Magenta pigment dispersion | JONCRYL ® 296 | 2 |
| Example thermal inkjet ink 8 | Black pigment dispersion | No additional binder | 0 |
| Example thermal inkjet ink 9 | Black pigment dispersion | JONCRYL ® 683 | 2 |
| Example thermal inkjet ink 10 | Black pigment dispersion | JONCRYL ® 296 | 2 |
| Comparative thermal inkjet ink 1 | Magenta pigment dispersion | PUG-542 | 2 |
| Comparative thermal inkjet ink 2 | Magenta pigment dispersion | PUG-542 | 4 |
| Comparative thermal inkjet ink 3 | Magenta pigment dispersion | PUG-7581 | 2 |
| Comparative thermal inkjet ink 4 | Magenta pigment dispersion | PUG-7581 | 4 |
| Comparative thermal inkjet ink 5 | Magenta pigment dispersion | PUD1 | 2 |
| Comparative thermal inkjet ink 6 | Magenta pigment dispersion | Hydran WLS-213 | 2 |
| Comparative thermal inkjet ink 7 | Magenta pigment dispersion | Hydran WLS-213 | 4 |
| Comparative thermal inkjet ink 8 | Black pigment dispersion | PUG-7581 | 2 |
| Comparative thermal inkjet ink 9 | Black pigment dispersion | PUG-542 | 2 |
| Comparative thermal inkjet ink 10 | Black pigment dispersion | PUG-7581 | 4 |
| Comparative thermal inkjet ink 11 | Black pigment dispersion | PUG-542 | 4 |
| Comparative thermal inkjet ink 12 | Black pigment dispersion | Hydran WLS-213 | 2 |
| Comparative thermal inkjet ink 13 | Black pigment dispersion | Hydran WLS-213 | 4 |

Each example thermal inkjet ink and each comparative thermal inkjet ink was tested for washfastness. Each example thermal inkjet ink and each comparative thermal inkjet ink was used to generate a print. An A4025 (12 ng) thermal inkjet pen was used to generate the prints at a 3 drop per pixel (dpp) ink flux. The prints were generated on pre-treated cotton fabric from Jacquard Products. The pre-treatment on the pre-treated cotton fabric included calcium and a polymer. No additional pre-treatment was performed on the pre-treated cotton fabric before generating the prints, and each print was allowed to dry without performing a curing process.

Each print was washed 5 times in a Kenmore 90 Series Washer (Model 110.289 227 91) with warm water (at about 40° C.) and detergent. Each print was allowed to air dry between each washes. The optical density (OD) of each print was measured before and after the prints were washed. Then the percent change in optical density was calculated for each print. Additionally, the ΔE was calculated for print (using the equation, $\Delta E = \sqrt{[(L^*before - L^*after)^2 + (a^*before - a^*after)^2 + (b^*before - b^*after)^2]}$). The optical density (OD) for each print before and after being washed and the results of the optical density (OD) change and ΔE calculations are shown below in Table 3.

TABLE 3

| Ink used to generate the print | OD before washing | OD after 5 washes | OD % change after 5 washes | ΔE | Thermal inkjet jettability |
|---|---|---|---|---|---|
| Example thermal inkjet ink 1 | 1.03 | 0.97 | −5.9 | 3.8 | Excellent |
| Example thermal inkjet ink 2 | 0.98 | 0.94 | −4.4 | 3.5 | Excellent |
| Example thermal inkjet ink 3 | 0.95 | 0.91 | −4.0 | 3.0 | Excellent |
| Example thermal inkjet ink 4 | 0.89 | 0.86 | −3.4 | 2.5 | Excellent |
| Example thermal inkjet ink 5 | 0.94 | 0.91 | −3.5 | 3.0 | Excellent |
| Example thermal inkjet ink 6 | 0.93 | 0.91 | −2.5 | 2.4 | Excellent |
| Example thermal inkjet ink 7 | 0.89 | 0.87 | −2.2 | 2.0 | Excellent |
| Example thermal inkjet ink 8 | 1.18 | 1.10 | −6.8 | 3.8 | Excellent |
| Example thermal inkjet ink 9 | 1.09 | 1.03 | −5.7 | 3.3 | Excellent |
| Example thermal inkjet ink 10 | 1.02 | 1.00 | −1.9 | 2.0 | Excellent |
| Comparative thermal inkjet ink 1 | 0.97 | 0.89 | −8.2 | 4.6 | Excellent |
| Comparative thermal inkjet ink 2 | 0.99 | 0.85 | −14.4 | 8.6 | Excellent |
| Comparative thermal inkjet ink 3 | 1.01 | 0.89 | −11.5 | 6.1 | Excellent |
| Comparative thermal inkjet ink 4 | 0.99 | 0.76 | −22.6 | 10.8 | Excellent |
| Comparative thermal inkjet ink 5 | 1.01 | 0.93 | −8.5 | 5.5 | Excellent |
| Comparative thermal inkjet ink 6 | 1.04 | 0.93 | −10.4 | 4.3 | Bad |
| Comparative thermal inkjet ink 7 | 1.01 | 0.94 | −7.4 | 4.5 | Bad |
| Comparative thermal inkjet ink 8 | 1.14 | 1.04 | −8.3 | 4.1 | Excellent |
| Comparative thermal inkjet ink 9 | 1.14 | 1.05 | −7.8 | 4.4 | Excellent |
| Comparative thermal inkjet ink 10 | 1.11 | 0.95 | −14.6 | 7.3 | Excellent |
| Comparative thermal inkjet ink 11 | 1.11 | 1.02 | −8.9 | 4.6 | Excellent |
| Comparative thermal inkjet ink 12 | 1.14 | 1.06 | −7.7 | 3.6 | Bad |
| Comparative thermal inkjet ink 13 | 1.15 | 1.08 | −6.2 | 3.8 | Bad |

As shown in Table 3, the change in optical density is less than 10% (e.g., less than 7%) for each of the prints generated by the example thermal inkjet inks, and the ΔE is less than 4 for each of the prints generated by the example thermal inkjet inks. These results indicate that the prints generated by the example thermal inkjet inks have good washfastness. As also shown in Table 3, the change in optical density is greater than 7% for each of the prints generated by comparative thermal inkjet inks 1-12 (and greater than 10% for each of the prints generated by comparative thermal inkjet inks 2-4, 6, and 10), and the ΔE is greater than 4 for each of the prints generated by comparative thermal inkjet inks 1-11.

These results indicate that the prints generated by comparative thermal inkjet inks 1-12 do not have good washfastness. While the print generated by comparative thermal inkjet ink 13 demonstrated good washfastness, comparative thermal inkjet ink 13 had bad thermal inkjet jettability (measured in terms of a Turn On Energy (TOE) curve, decap, and decel). Comparative thermal inkjet inks 6, 7, and 12 also had bad thermal inkjet jettability (measured in terms of a TOE curve, decap, and decel). All of the example thermal inkjet inks and comparative thermal inkjet inks 1-5 and 8-11 had excellent thermal inkjet jettability (measured in terms of a TOE curve, decap, and decel). The comparative thermal inkjet inks that had "bad" thermal inkjet jettability had either poor decap or a poor TOE curve and poor decel. The example thermal inkjet inks and comparative thermal inkjet inks that had "excellent" thermal inkjet jettability had good decap, a good TOE curve, and no decel.

Further, the change in optical density and the ΔE of the prints generated by the example thermal inkjet inks (without a post-printing curing process) were comparable to the change in optical density and the ΔE of the prints generated with ARTISTRI® P5000 inks (available from Dupont) using piezoelectric printheads and a post-printing curing process. With a post-printing curing process, a magenta ARTISTRI® P5000 ink can generate a print with a ΔE of 2.6, and an optical density of 0.759 before washing and an optical density of 0.726 after washing, and thus a change in optical density of −4.3%. Also with a post-printing curing process, a black ARTISTRI® P5000 ink can generate a print with an ΔE of 2.4, and an optical density of 0.948 before washing and an optical density of 0.905 after washing, and thus a change in optical density of −4.5%. The prints generated by the example thermal inkjet inks performed as well as the ARTISTRI® P5000 inks (that were cured) in terms of optical density, and without curing. The ARTISTRI® P5000 inks also have bad thermal inkjet jettability (measured in terms of a Turn On Energy (TOE) curve, decap, and decel).

Each example thermal inkjet ink and each comparative thermal inkjet ink was also tested for stability. Each example and comparative thermal inkjet ink was stored in an accelerated storage (AS) environment at a temperature of 60° C. for one week. The particle size for each example and comparative thermal inkjet ink was measured before and after the ink formulations were stored in the AS environment. The particle size for each example and comparative thermal inkjet ink was measured in terms of the volume-weighted mean diameter (Mv) and the D95 (i.e., 95% the population is below this value) using dynamic light scattering with a NANOTRAC® WAVE™ particle size analyzer (available from MICROTRAC™—NIKKISO GROUP™). Then the percent change in particle size was calculated for each example and comparative thermal inkjet ink. The particle size for each example and comparative thermal inkjet ink before and after one week in the AS environment and the results of the particle size change calculations are shown below in Table 4.

TABLE 4

| Ink | Particle size before AS (Mv, μm) | Particle size before AS (D95, μm) | Particle size after 1 wk AS (Mv, μm) | Particle size after 1 wk AS (D95, μm) | Particle size change after 1 wk AS (Mv, %) | Particle size change after 1 wk AS (D95, %) |
|---|---|---|---|---|---|---|
| Example thermal inkjet ink 1 | 0.1004 | 0.1640 | 0.1037 | 0.1603 | 3.3 | −2.3 |
| Example thermal inkjet ink 2 | 0.0998 | 0.1660 | 0.1002 | 0.1619 | 0.4 | −2.5 |

TABLE 4-continued

| Ink | Particle size before AS (Mv, μm) | Particle size before AS (D95, μm) | Particle size after 1 wk AS (Mv, μm) | Particle size after 1 wk AS (D95, μm) | Particle size change after 1 wk AS (Mv, %) | Particle size change after 1 wk AS (D95, %) |
|---|---|---|---|---|---|---|
| Example thermal inkjet ink 3 | 0.1037 | 0.1630 | 0.1000 | 0.1651 | −3.6 | 1.3 |
| Example thermal inkjet ink 4 | 0.1019 | 0.1670 | 0.1015 | 0.1607 | −0.4 | −3.8 |
| Example thermal inkjet ink 5 | 0.1031 | 0.1680 | 0.0988 | 0.1627 | −4.2 | −3.2 |
| Example thermal inkjet ink 6 | 0.1000 | 0.1631 | 0.1003 | 0.1569 | 0.3 | −3.8 |
| Example thermal inkjet ink 7 | 0.1039 | 0.1712 | 0.1039 | 0.1687 | 0.0 | −1.5 |
| Example thermal inkjet ink 8 | 0.1126 | 0.1861 | 0.0965 | 0.1676 | −14.3 | −9.9 |
| Example thermal inkjet ink 9 | 0.1055 | 0.1740 | 0.0988 | 0.1633 | −6.4 | −6.1 |
| Example thermal inkjet ink 10 | 0.1122 | 0.1857 | 0.1021 | 0.1586 | −9.0 | −14.6 |
| Comparative thermal inkjet ink 1 | 0.1021 | 0.1634 | 0.1018 | 0.1624 | −0.3 | −0.6 |
| Comparative thermal inkjet ink 2 | 0.1036 | 0.1600 | 0.0976 | 0.1654 | −5.8 | 3.4 |
| Comparative thermal inkjet ink 3 | 0.1035 | 0.1661 | 0.1023 | 0.1630 | −1.2 | −1.9 |
| Comparative thermal inkjet ink 4 | 0.1027 | 0.1740 | 0.1034 | 0.1649 | 0.7 | −5.2 |
| Comparative thermal inkjet ink 5 | 0.1007 | 0.1692 | 0.0996 | 0.1611 | −1.1 | −4.8 |
| Comparative thermal inkjet ink 6 | 0.0996 | 0.1730 | 0.1003 | 0.1656 | 0.7 | −4.3 |
| Comparative thermal inkjet ink 7 | 0.1004 | 0.1650 | 0.1026 | 0.1646 | 2.2 | −0.2 |
| Comparative thermal inkjet ink 8 | 0.1109 | 0.1780 | 0.0978 | 0.1602 | −11.8 | −10.0 |
| Comparative thermal inkjet ink 9 | 0.1084 | 0.1853 | 0.0970 | 0.1585 | −10.5 | −14.5 |
| Comparative thermal inkjet ink 10 | 0.1117 | 0.1990 | 0.1042 | 0.1689 | −6.7 | −15.1 |
| Comparative thermal inkjet ink 11 | 0.1050 | 0.1780 | 0.1014 | 0.1600 | −3.4 | −10.1 |
| Comparative thermal inkjet ink 12 | 0.1097 | 0.1870 | 0.1015 | 0.1615 | −7.5 | −13.6 |
| Comparative thermal inkjet ink 13 | 0.1118 | 0.1860 | 0.1046 | 0.1794 | −6.4 | −3.5 |

Additionally, each example and comparative thermal ink was put through a T-cycle. During the T-cycle, each example and comparative thermal inkjet ink was heated to and maintained at a high temperature of 70° C. for 4 hours, and then each ink was cooled to and maintained at a low temperature of −40° C. for 4 hours. This process was repeated for each example and comparative thermal inkjet ink for 5 cycles. For each example and comparative thermal inkjet ink, the particle size (in terms of Mv and D95) was measured before and after the T-cycle, and the percent change in particle size was calculated. The particle size for each example and comparative thermal inkjet ink before and after the T-cycle and the results of the particle size change calculations are shown below in Table 5.

TABLE 5

| Ink | Particle size before AS (Mv, μm) | Particle size before AS (D95, μm) | Particle size after T-cycle (Mv, μm) | Particle size after T-cycle (D95, μm) | Particle size % change after T-cycle (Mv, %) | Particle size % change after T-cycle (D95, %) |
|---|---|---|---|---|---|---|
| Example thermal inkjet ink 1 | 0.1004 | 0.1640 | 0.1003 | 0.1626 | −0.1 | −0.9 |
| Example thermal inkjet ink 2 | 0.0998 | 0.1660 | 0.1013 | 0.1492 | 1.5 | −10.1 |
| Example thermal inkjet ink 3 | 0.1037 | 0.1630 | 0.1004 | 0.1610 | −3.2 | −1.2 |
| Example thermal inkjet ink 4 | 0.1019 | 0.1670 | 0.0993 | 0.1611 | −2.6 | −3.5 |
| Example thermal inkjet ink 5 | 0.1031 | 0.1680 | 0.1020 | 0.1665 | −1.1 | −0.9 |
| Example thermal inkjet ink 6 | 0.1000 | 0.1631 | 0.0992 | 0.1647 | −0.8 | 1.0 |

TABLE 5-continued

| Ink | Particle size before AS (Mv, μm) | Particle size before AS (D95, μm) | Particle size after T-cycle (Mv, μm) | Particle size after T-cycle (D95, μm) | Particle size % change after T-cycle (Mv, %) | Particle size % change after T-cycle (D95, %) |
|---|---|---|---|---|---|---|
| Example thermal inkjet ink 7 | 0.1039 | 0.1712 | 0.1062 | 0.1641 | 2.2 | −4.1 |
| Example thermal inkjet ink 8 | 0.1126 | 0.1861 | 0.0967 | 0.1628 | −14.1 | −12.5 |
| Example thermal inkjet ink 9 | 0.1055 | 0.1740 | 0.0999 | 0.1607 | −5.3 | −7.6 |
| Example thermal inkjet ink 10 | 0.1122 | 0.1857 | 0.1053 | 0.1630 | −6.1 | −12.2 |
| Comparative thermal inkjet ink 1 | 0.1021 | 0.1634 | 0.1005 | 0.1654 | −1.6 | 1.2 |
| Comparative thermal inkjet ink 2 | 0.1036 | 0.1600 | 0.1013 | 0.1635 | −2.2 | 2.2 |
| Comparative thermal inkjet ink 3 | 0.1035 | 0.1661 | 0.1014 | 0.1687 | −2.0 | 1.6 |
| Comparative thermal inkjet ink 4 | 0.1027 | 0.1740 | 0.1025 | 0.1701 | −0.2 | −2.2 |
| Comparative thermal inkjet ink 5 | 0.1007 | 0.1692 | 0.0995 | 0.1634 | −1.2 | −3.4 |
| Comparative thermal inkjet ink 6 | 0.0996 | 0.1730 | 0.0986 | 0.1640 | −1.0 | −5.2 |
| Comparative thermal inkjet ink 7 | 0.1004 | 0.1650 | 0.1010 | 0.1640 | 0.6 | −0.6 |
| Comparative thermal inkjet ink 8 | 0.1109 | 0.1780 | 0.0981 | 0.1610 | −11.5 | −9.6 |
| Comparative thermal inkjet ink 9 | 0.1084 | 0.1853 | 0.0975 | 0.1527 | −10.1 | −17.6 |
| Comparative thermal inkjet ink 10 | 0.1117 | 0.1990 | 0.1053 | 0.1700 | −5.7 | −14.6 |
| Comparative thermal inkjet ink 11 | 0.1050 | 0.1780 | 0.1028 | 0.1670 | −2.1 | −6.2 |
| Comparative thermal inkjet ink 12 | 0.1097 | 0.1870 | 0.1037 | 0.1710 | −5.5 | −8.6 |
| Comparative thermal inkjet ink 13 | 0.1118 | 0.1860 | 0.1057 | 0.1690 | −5.5 | −9.1 |

The results shown in Tables 4 and 5 indicate that the stability of the example thermal inkjet inks is comparable to the stability of the comparative inkjet inks.

Example 2

Some of the example thermal inkjet inks (1-3, and 5-10) and some of the comparative inkjet inks (1, 3, 5, 8 and 9) from Example 1 were used to generate prints on Graph Plus media (including cellulose fibers). The optical density (OD) was measured for each of the prints. The durability (wet rub) was also measured for each of the prints. The damage to the print was graded visually using a scale of 0-5, with 0 indicating no damage seen and 5 indicating that the ink film was rubbed off completely. The results of the optical density (OD) and durability measurements are shown below in Table 6.

TABLE 6

| Ink used to generate the print | OD | Durability |
|---|---|---|
| Example thermal inkjet ink 1 | 1.60 | 3 |
| Example thermal inkjet ink 2 | 1.65 | 2 |
| Example thermal inkjet ink 3 | 1.83 | 1 |
| Example thermal inkjet ink 5 | 1.78 | 3 |
| Example thermal inkjet ink 6 | 1.88 | 3.5 |
| Example thermal inkjet ink 7 | 1.56 | 3 |
| Example thermal inkjet ink 8 | 1.66 | 3.5 |
| Example thermal inkjet ink 9 | 2.01 | 2 |
| Example thermal inkjet ink 10 | 2.29 | 2 |
| Comparative thermal inkjet ink 1 | 1.92 | 0.5 |
| Comparative thermal inkjet ink 3 | 1.63 | 0 |

TABLE 6-continued

| Ink used to generate the print | OD | Durability |
|---|---|---|
| Comparative thermal inkjet ink 5 | 1.66 | 0 |
| Comparative thermal inkjet ink 8 | 1.57 | 0.5 |
| Comparative thermal inkjet ink 9 | 2.01 | 0.5 |

As shown in Table 6, the comparative thermal inkjet inks demonstrate better durability on paper media than the example thermal inkjet inks. As such, it was unexpected that the example thermal inkjet inks would have better washfastness than the comparative thermal inkjet inks on cotton fabrics.

It is to be understood that the ranges provided herein include the stated range and any value or sub-range within the stated range. For example, a range from about 120 mg KOH/g to about 300 mg KOH/g should be interpreted to include not only the explicitly recited limits of from about 120 mg KOH/g to about 300 mg KOH/g, but also to include individual values, such as 131 mg KOH/g, 180 mg KOH/g, 200 mg KOH/g, 278.5 mg KOH/g, 295 mg KOH/g, etc., and sub-ranges, such as from about 121 mg KOH/g to about 295 mg KOH/g, from about 150 mg KOH/g to about 235 mg KOH/g, from about 250 mg KOH/g to about 300 mg KOH/g, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for printing on a textile, comprising:
generating a print by thermal inkjet printing a thermal inkjet ink on a cotton fabric, the thermal inkjet ink including:
a pigment;
a single dispersant and binder resin, the single dispersant and binder resin being a styrene acrylic resin having an acid number greater than 100 mg KOH/g and a weight average molecular weight less than 50,000;
a vehicle including a co-solvent, an anti-kogation agent, an anti-decel agent, a surfactant, a biocide, a pH adjuster, or combinations thereof; and
a balance of water;
wherein the print is generated without a post-printing curing process.

2. The method as defined in claim 1 wherein the print exhibits a ΔE ranging from about 2.0 to about 3.5 after being washed.

3. The method as defined in claim 1 wherein:
the cotton fabric is an as-received pre-treated cotton fabric; and
generating the print is performed without performing a pre-treatment process on the as-received pre-treated cotton fabric.

4. The method as defined in claim 1 wherein:
the cotton fabric is an as-received pre-treated cotton fabric; and
a pre-treatment on the as-received pre-treated cotton fabric includes calcium, polymer, or a combination thereof.

5. The method as defined in claim 1 wherein the single dispersant and binder is physically absorbed to at least some of the pigment.

6. The method as defined in claim 1 wherein the styrene acrylic resin has an acid number ranging from about 120 mg KOH/g to about 300 mg KOH/g and a weight average molecular weight ranging from about 3,000 to about 30,000.

7. The method as defined in claim 1 wherein:
the pigment is present in an amount ranging from about 0.5 wt % to about 6 wt % of a total weight of the thermal inkjet ink; and
the single dispersant and binder resin is present in an amount ranging from about 0.1 wt % to about 6 wt % of the total weight of the thermal inkjet ink.

8. The method as defined in claim 1 wherein the thermal inkjet ink consists of the pigment; the single dispersant and binder resin; the vehicle; and the water.

9. A method for improving washfastness of a cotton fabric, the method comprising:
introducing the cotton fabric into a thermal inkjet printer;
using the thermal inkjet printer, generating a print by thermal inkjet printing a thermal inkjet ink on the cotton fabric, the thermal inkjet ink including:
a pigment;
a single dispersant and binder resin, the single dispersant and binder resin being a styrene acrylic resin having an acid number greater than 100 mg KOH/g and a weight average molecular weight less than 50,000;
a vehicle including a co-solvent, an anti-kogation agent, an anti-decel agent, a surfactant, a biocide, a pH adjuster, or combinations thereof; and
a balance of water; and
allowing the print to dry without performing a curing process.

10. The method as defined in claim 9, further comprising washing the cotton fabric with the print thereon at least five times, wherein the print exhibits a ΔE ranging from about 2.0 to about 3.5 after the washings.

11. The method as defined in claim 9 wherein:
the cotton fabric is an as-received pre-treated cotton fabric; and
generating the print is performed without performing a pre-treatment process on the as-received pre-treated cotton fabric.

12. The method as defined in claim 9 wherein:
the cotton fabric is an as-received pre-treated cotton fabric; and
a pre-treatment on the as-received pre-treated cotton fabric includes calcium, a polymer, or a combination thereof.

13. The method as defined in claim 9 wherein the styrene acrylic resin has an acid number ranging from about 120 mg KOH/g to about 300 mg KOH/g and a weight average molecular weight ranging from about 3,000 to about 30,000.

14. The method as defined in claim 9 wherein the thermal inkjet ink consists of the pigment; the single dispersant and binder resin; the vehicle; and the water.

15. A method for making a thermal inkjet ink, comprising:
mixing a vehicle with a pigment dispersion;
wherein:
the vehicle includes water and a co-solvent, an anti-kogation agent, an anti-decel agent, a surfactant, a biocide, a pH adjuster, or combinations thereof;
the pigment dispersion includes water, a pigment, and a single dispersant and binder resin, the single dispersant and binder resin being a styrene acrylic resin having an acid number greater than 100 mg KOH/g and a weight average molecular weight less than 50,000; and
no additional dispersant or binder resin is added to the pigment dispersion or to the vehicle.

* * * * *